No. 774,885. PATENTED NOV. 15, 1904.
J. LOEPP.
UNDERCUT SAW GUIDE.
APPLICATION FILED APR. 26, 1904.
NO MODEL.
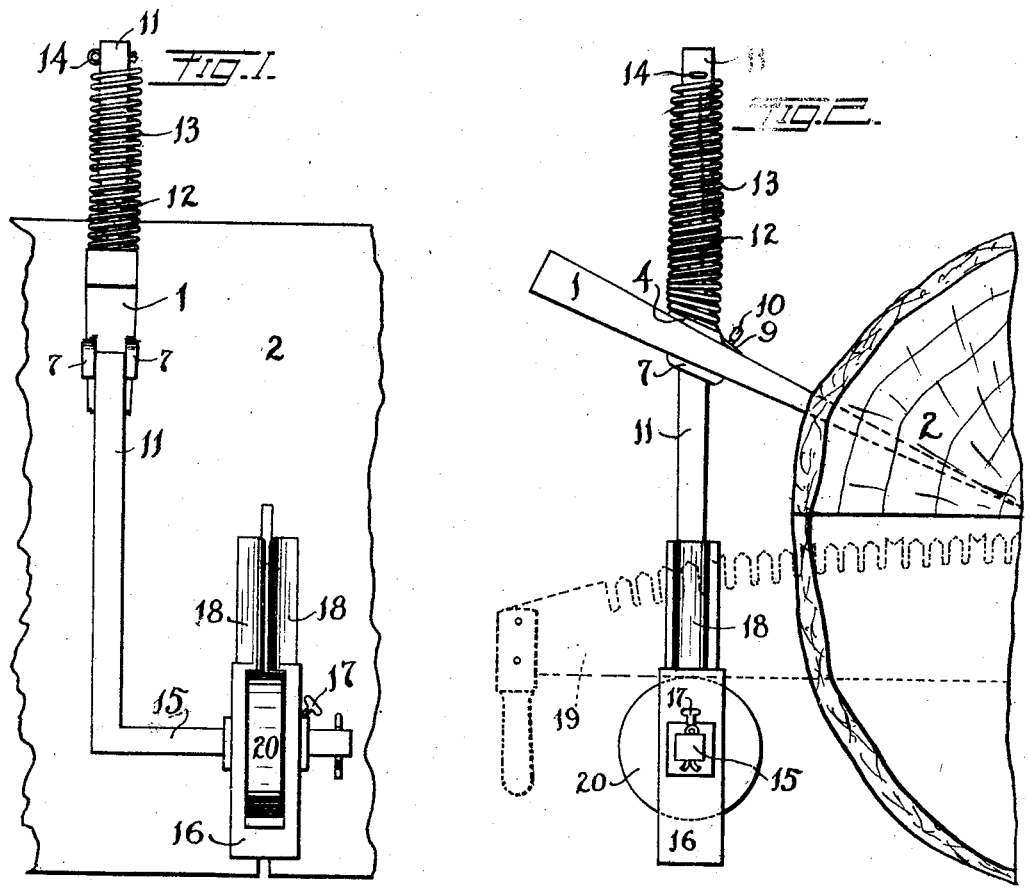
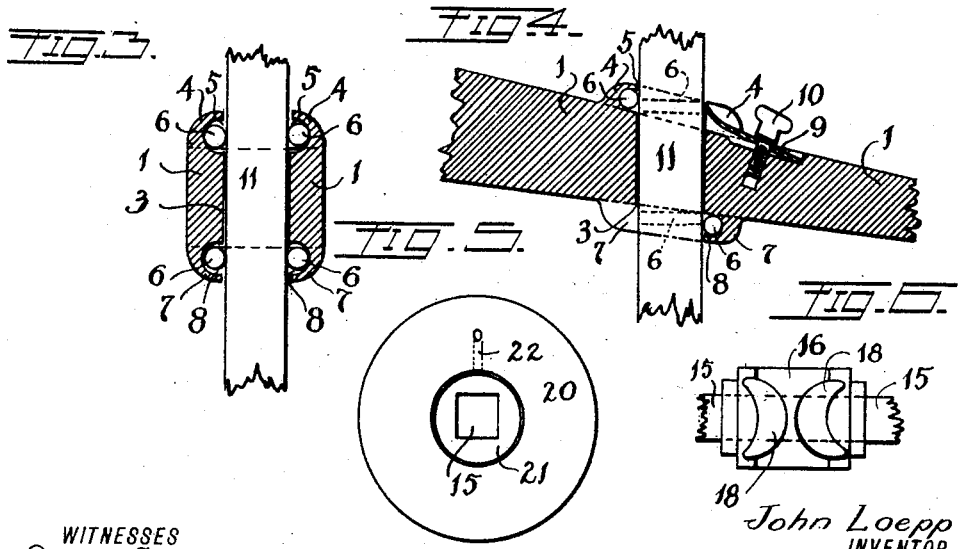
WITNESSES
Anne Cowen
W. E. Windsor
John Loepp
INVENTOR
R. J. Elliott
BY ATTORNEY No. 774,885.

Patented November 15, 1904.

UNITED STATES PATENT OFFICE.

JOHN LOEPP, OF TACOMA, WASHINGTON.

UNDERCUT SAW-GUIDE.

SPECIFICATION forming part of Letters Patent No. 774,885, dated November 15, 1904.

Application filed April 26, 1904. Serial No. 204,994. (No model.)

*To all whom it may concern:*

Be it known that I, JOHN LOEPP, a citizen of the United States of America, residing near Tacoma, in the county of Pierce, State of Washington, have invented certain new and useful Improvements in Undercut Saw-Guides, of which the following is a specification.

This invention relates to devices for supporting and guiding a saw when making an undercut in a log, and has for its objects, first, to provide a guide which shall be adjustable longitudinally and which shall always press the saw upward with an even pressure; second, which shall be reversible—that is, it can be used either to the right or left hand of the supporting-spike; third, which shall take the weight of the saw, so that the power of the sawyer may be put entirely into making the cut instead of having to continuously lift the weight of the saw.

I attain these objects by the devices illustrated in the accompanying drawings, in which—

Figure 1 is a front view of my device in operation. Fig. 2 is a side view thereof. Fig. 3 is a vertical cross-section of the spike, showing the bar passing through it. Fig. 4 is a vertical longitudinal section of a part of the spike, showing the bar passing through it. Fig. 5 is a side view of the roller on which the saw rests, and Fig. 6 is a plan of the saw-guide.

Similar numerals of reference refer to similar parts throughout the several views.

The spike 1, which supports my device, is adapted to be driven firmly into the log 2 and to extend outward therefrom a sufficient distance to allow the guide free vertical movement beside the log. The vertical hole 3 passes through this spike. On three sides of this hole 3 on the upper side of the spike is the collar 4, having recesses 5, adjoining the hole 3, adapted to receive rollers 6. The collar 4 does not extend across the side of the hole 3 nearest to the point of the spike. The similar collar 7 is on three sides of the hole 3 on the lower side of the spike and is similarly provided with recesses 8, adapted to receive the rollers 6. The open side of this collar 7 is that farthest from the point of the spike. The rollers 6 extend sufficiently out from the recesses to engage the sides of the hereinafter-described bar, so as to reduce the friction due to the binding of the bar on the sides of the hole 3. The spring-brake 9 rests in a recess on the upper side of the spike near the side of the hole 3 nearest to the point and is adapted to engage the side of the bar and to be pressed against it with an adjustable pressure by means of the thumb-screw 10, as shown in Fig. 4.

The bar 11 passes vertically through the hole 3 and is made of rectangular section, but with a rounded and tapered part 12 near its upper end, which is adapted to allow it to be rotated in the square hole 3 in the spike 1 when it is desired to change the device from a left to a right handed position, or vice versa. The spring 13 is placed around the bar 11 above the spike 1, so as to engage the top of the collar 4, and is kept in place by the split pin 14 or any other suitable means, being compressed between said split pin and said collar to supply the force to lift the weight of the saw and to give the proper upward pressure of the saw against the wood of the log it is cutting.

The lower end of the bar 11 is bent at right angles thereto to form an arm 15, on which the saw-guide is adjustably supported.

This saw-guide consists of the following parts: a frame or yoke 16, supported by the arm 15, which passes through it, and having a set-screw 17 in its side adapted to screw against said arm 15, so as to clasp the frame 16 at any point on the arm. This frame 16 has two upward extensions or ears 18, shaped substantially as shown in Figs. 1, 2, and 6 and adapted to retain and to guide the saw 19 between them. The saw rests on the roller or wheel 20, which is supported in the yoke 16 on the central circular core 21, having a square hole in its center adapted to receive the arm 15. The roller 20 may be oiled through the small hole 22 in its side leading to the surface between it and the core 21.

The operation of my device is briefly described as follows: The spike is driven into the log at a convenient point. Then the spring 13 is compressed by pushing the bar 11 downward. Then the saw is placed between the ears 18 and on the roller 20, being pressed upward by means of the spring 13. The strength of this pressure is regulated by the brake 9 and the screw 10 controlling it. Thus with a lighter saw this brake would be screwed tighter than it would be with a heavier saw. The side rollers 6 take up the side twist, due to the saw being at a point on one side of the spike, and prevent the bar from being cramped in the hole 3. The upper and lower rollers take the pressure due to the brake 9 against the bar 11.

Having now described my invention, what I claim, and desire to secure by Letters Patent, is—

1. In an undercut saw-guide, the combination with a spike adapted to be driven into a log, of a vertical bar passing through said spike and carrying a saw-guide on its lower extremity, and a spring interposed between said spike and said vertical bar whereby said saw-guide is constantly pressed upward.

2. In an undercut saw-guide, the combination with a spike adapted to be driven into a log, of a vertical bar passing through said spike, said bar having a horizontal extension at its lower extremity, a saw-guide adjustably mounted on said horizontal extension to said bar, and a spring interposed between said spike and said vertical bar whereby said saw-guide is constantly pressed upward.

3. In an undercut saw-guide, the combination with a spike adapted to be driven into a log and having a vertical hole therethrough, roller-bearings mounted in recesses in said spike and extending into said hole, a vertical bar passing through said hole and engaging said roller-bearings said bar having a horizontal extension at its lower extremity, a saw-guide adjustably mounted on said horizontal extension to said bar, and a spring interposed between said spike and said vertical bar whereby said saw-guide is constantly pressed upward.

4. In an undercut saw-guide, the combination with a spike adapted to be driven into a log and having a vertical hole therethrough, roller-bearings mounted in recesses in said spike and extending into said hole, a vertical bar passing through said hole and engaging said roller-bearings said bar having a horizontal extension at its lower extremity, a saw-guide adjustably mounted on said horizontal extension to said bar, a wheel mounted in said saw-guide and adapted to engage the back of the saw, and a spring interposed between said spike and said vertical bar whereby said saw-guide is constantly pressed upward.

5. In an undercut saw-guide, the combination with a spike adapted to be driven into a log and having a vertical hole therethrough, roller-bearings mounted in recesses in said spike and extending into said hole, a vertical bar passing through said hole and engaging said roller-bearings said bar having a horizontal extension at its lower extremity, an adjustable friction-brake secured to said spike and engaging said vertical bar to retard it, a saw-guide adjustably mounted on said horizontal extension to said bar, and a spring interposed between said spike and said vertical bar whereby said saw-guide is constantly pressed upward.

6. In an undercut saw-guide, the combination with a spike adapted to be driven into a log, of a saw-guide supported by said spike, a spring interposed between said spike and said saw-guide whereby said saw-guide is constantly pressed upward, and an adjustable friction-brake secured to said spike and adapted to retard the action of said spring on said saw-guide.

Signed at Tacoma this 8th day of April, 1904.

JOHN LOEPP.

Witnesses:
ANNE COWEN,
WILLIAM E. WINDSOR.